United States Patent
Reddy et al.

(10) Patent No.: US 11,809,575 B1
(45) Date of Patent: Nov. 7, 2023

(54) PLATFORM AND METHOD FOR ASSESSMENT AND VERIFICATION OF SOFTWARE BILL OF MATERIALS (SBOM) AND VULNERABILITIES ACROSS A SOFTWARE SUPPLY CHAIN LIFE CYCLE USING BLOCKCHAIN

(71) Applicant: Cryptosoft Inc., Plano, TX (US)

(72) Inventors: Ashok Reddy, Plano, TX (US); Robert Kent Lamb, Middletown, NJ (US); Shoeb Javed, Allen, TX (US)

(73) Assignee: CRYPTOSOFT INC., Plano, TX (US)

( * ) Notice: Subject to any disclaimer, the term of this patent is extended or adjusted under 35 U.S.C. 154(b) by 0 days.

(21) Appl. No.: 18/139,274

(22) Filed: Apr. 25, 2023

Related U.S. Application Data

(60) Provisional application No. 63/388,179, filed on Jul. 11, 2022.

(51) Int. Cl.
*G06F 21/57* (2013.01)
*G06Q 10/0875* (2023.01)
*G06Q 30/018* (2023.01)

(52) U.S. Cl.
CPC ....... *G06F 21/577* (2013.01); *G06Q 10/0875* (2013.01); *G06Q 30/018* (2013.01); *G06F 2221/033* (2013.01)

(58) Field of Classification Search
CPC .................................. H04L 9/50; H04L 63/32
See application file for complete search history.

(56) References Cited

U.S. PATENT DOCUMENTS

| | | | |
|---|---|---|---|
| 2020/0201620 A1* | 6/2020 | Beard | G06F 21/64 |
| 2021/0021644 A1* | 1/2021 | Crabtree | G06F 21/577 |
| 2023/0072264 A1* | 3/2023 | Coccia | G06F 21/44 |

* cited by examiner

*Primary Examiner* — Fatoumata Traore

(57) ABSTRACT

Embodiments herein provide a blockchain based platform and method for assessment and verification of Software Bill of Materials (SBOM) across a software supply chain life cycle using blockchain. The method comprising generating the SBOM automatically from a software source code to automate governance of a software asset using blockchain smart contracts, publishing the generated SBOMs to a permissioned blockchain through secure publish, automatically recording timestamps and ownership stamps to the published SBOM's, analysing the software asset for supply chain information to verify if the software asset meets the minimum policy requirements for compliance based on provenance, licensing, vulnerability and security criteria set by the company, determining if a third-party software component is approved for use in the company's applications based on policy and compliance rules and identifying current vulnerabilities and potential remediation for software in use by the company.

11 Claims, 25 Drawing Sheets

PLATFORM AND METHOD FOR ASSESSMENT AND VERIFICATION OF SOFTWARE BILL OF MATERIALS (SBOM) AND VULNERABILITIES ACROSS A SOFTWARE SUPPLY CHAIN LIFE CYCLE USING BLOCKCHAIN

BACKGROUND

Technical Field

The embodiments herein generally relate to a software supply chain process, and more particularly, to a platform for assessment and verification of Software Bill of Materials (SBOM) and vulnerabilities across a software supply chain life cycle using blockchain and crypto technologies.

Description of the Related Art

Most enterprise companies today frequently face software supply chain attacks and do not have a clear way to trust and verify the software they consume, produce, and operate. One of the ways to mitigate the risk associated with such supply chain attacks is to enable companies to build/produce Software Bill of Materials (SBOM) or Digital BOM (DBOM) artefacts that enable the companies to know the exact dependencies, origin, and provenance of their software assets. The SBOM associated with a software may be marked as a software nutrition facts label (manifest) with different ingredients, components, results of quality and vulnerability scans, who developed, dependencies, etc that provide an accurate assessment of the trustworthiness of a given piece of software product or application.

Presently, there doesn't exist any SBOM or DBOM to capture changes or updates whenever any change occurs in any version of the software product or app. This includes any change in the code that the supplier itself wrote as well as any change in one of the software components when a component is added, removed or upgraded. Whenever there is a change to a component's name or change in the component supplier, a new SBOM reflecting these changes should be generated. Further, when the same change occurs in multiple versions of a product, such as when a certain vulnerability is patched in multiple versions, a new SBOM needs to be released for each of those changed versions. This would potentially require a huge number of SBOMs to be released daily, to overcome any identified software vulnerability.

Further, it is important for all these SBOM's to be shared with an SBOM sharing platform, which in turn needs to have built-in primitives for establishing the provenance and granularly controlling access to the shared SBOMs. This is because SBOMs sometimes contain manifest data that organizations do not want to put out in the open environment to avoid hackers from targeting applications that may have consumed an open-source component that may have a new vulnerability discovered after the product is released.

In view of the foregoing, there is a need to mitigate drawbacks of the existing systems and methods to securely publish, store, share, and verify SBOMs and the software nutrition facts labels associated with any software asset in a software supply chain cycle.

SUMMARY

Embodiments herein provide a blockchain based platform and method for software supply chain lifecycle management for the creation, publishing, sharing, and consumption of SBOM's (Software bill of materials) or DBOM's (Digital bill of materials) across the software supply chain lifecycle. The SBOMs, either generated automatically from the source code of the software or existing SBOM's is employed as input to automate the governance of the software development and deliver using blockchain smart contracts for attribution, verification, certification, etc.

In one aspect, described herein is a computer-readable storage medium configured with computer-readable code that when executed by one or more processors of a processing system cause carrying out a method for assessment of Software Bill of Materials (SBOM) across a software supply chain life cycle over a blockchain platform. The method comprises of generating a Software Bill of Materials (SBOMs) automatically from a software source code to automate governance of a software asset using blockchain smart contracts, publishing the generated Bill of Materials (SBOMs) to a permissioned blockchain through secure publish, automatically recording timestamps and ownership stamps to the published SBOM's to protect rights for software vendors and provide security to consumers of the software, enabling tracing of ownership of the software assets through the ownership stamps using one or more smart contracts and enabling product or application owners to approve or reject based on an analysis of the software supply chain information. The analysis of the software supply chain information comprises of enabling software consumers to analyse the software asset for supply chain information, verifying if the software asset meets the minimum policy requirements for compliance based on provenance, licensing, vulnerability and security criteria set by the company, determining if a third-party software component is approved use in the company's applications based on policy and compliance rules and identifying current vulnerabilities and potential remediation for software in use by the company.

In some embodiments, the method herein further comprises of establishing secured attestation channels between subscribed users to share policy-based complementary SBOM data and metadata exchange between one or more subscribers of the channels.

In some embodiments, the secure attestation channel scheme allows for a decentralized root of trust for the one or more subscribers to provide an opportunity for third-party vendors to enrich and create SBOM metadata and attestations.

In some embodiments, the method herein further comprises of automating storing of the SBOM's to a local or distributed database in real-time for each version of software assets developed and providing access to the stored SBOMs to one or more users, each user being associated with an entity. The access privilege is provided for each user based on a role of each user.

Optionally, the method herein comprises of implementing the blockchain platform in a Software Vulnerability and Nutrition Tracker application. The Software Vulnerability and Nutrition Tracker application is configured for providing instructions to one or more processors to perform the method of allowing one or more users of the software to monitor vulnerabilities arising in the software assets or dependencies in the software assets in use by company in real-time, identifying the software assets in use by the company which are impacted by the vulnerability, identify and assess impact of vulnerability to the company and identifying potential remediation measures and track remediation until vulnerability is resolved.

In some embodiments, the one or more processors herein is configured for calling an audit smart contract on deployment of the software asset. The smart contract is configured for: accessing one or more trust assertions published in a blockchain and determining whether a plurality of audit requirements have been satisfied by a plurality of corresponding audits of the software asset based on the one or more trust assertions published to the blockchain and sending a response of the evaluation of software assets back to the blockchain platform if the software asset is marked with security vulnerability.

In another aspect, disclosed herein is a blockchain platform for enabling assessment of Software Bill of Materials (SBOM) across a software supply chain life cycle. The blockchain platform comprising in combination a network device with one or more processors, a non-transitory computer readable medium and a blockchain platform access interface. The blockchain platform is configured to generate a Software Bill of Materials (SBOMs) automatically from a software source code to automate governance of a software asset using blockchain smart contracts, publish the generated Bill of Materials (SBOMs) to a permissioned blockchain through secure publish, automatically record timestamps and ownership stamps to the published SBOM's to protect rights for software vendors and provide security to consumers of the software, enable tracing of ownership of the software assets through the ownership stamps using one or more smart contracts, enable product or application owners to approve or reject based on an analysis of the software supply chain information.

In some embodiments, analysis of the software supply chain information comprises of enabling software consumers to analyse the software asset for supply chain information, verifying if the software asset meets the minimum policy requirements for compliance based on provenance, licensing, vulnerability and security criteria set by the company, determining if a third-party software component is approved use in the company's applications based on policy and compliance rules and identifying current vulnerabilities and potential remediation for software in use by the company.

In some embodiments, the blockchain platform is configured to establish secured attestation channels between subscribed users to share policy-based complementary SBOM data and metadata exchange between one or more subscribers of the channels.

In some embodiments, the secure attestation channel allows to establish a decentralized root of trust for the one or more subscribers to provide an opportunity for third-party vendors to enrich and create SBOM metadata and attestations.

In some embodiments, the blockchain platform is configured to automate storing of the SBOM's to a local or distributed database in real-time for each version of software assets developed and provide access to the stored SBOMs to one or more users, each user being associated with an entity, wherein access privilege is present for each user based on a role of each user.

In some embodiments, the blockchain platform is configured to configured to be implemented in a Software Vulnerability and Nutrition Tracker application. The Software Vulnerability and Nutrition Tracker application is configured for providing instructions to one or more processors to execute the steps comprising allowing one or more users of the software to monitor vulnerabilities arising in the software assets or dependencies in the software assets in use by company in real-time, identifying the software assets in use by the company which are impacted by the vulnerability, identify and assess impact of vulnerability to the company, and identifying potential remediation measures and track remediation until vulnerability is resolved.

In yet another aspect, disclosed herein is a system for assessment of Software Bill of Materials (SBOM) across a software supply chain life cycle. The system comprising in combination a network node device, characterized by comprising: one or more processors and a non-transitory computer readable medium and a network interface and a blockchain platform, wherein the platform framework layer is connected to an application layer through an application programmable interface to execute the method as described herein.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
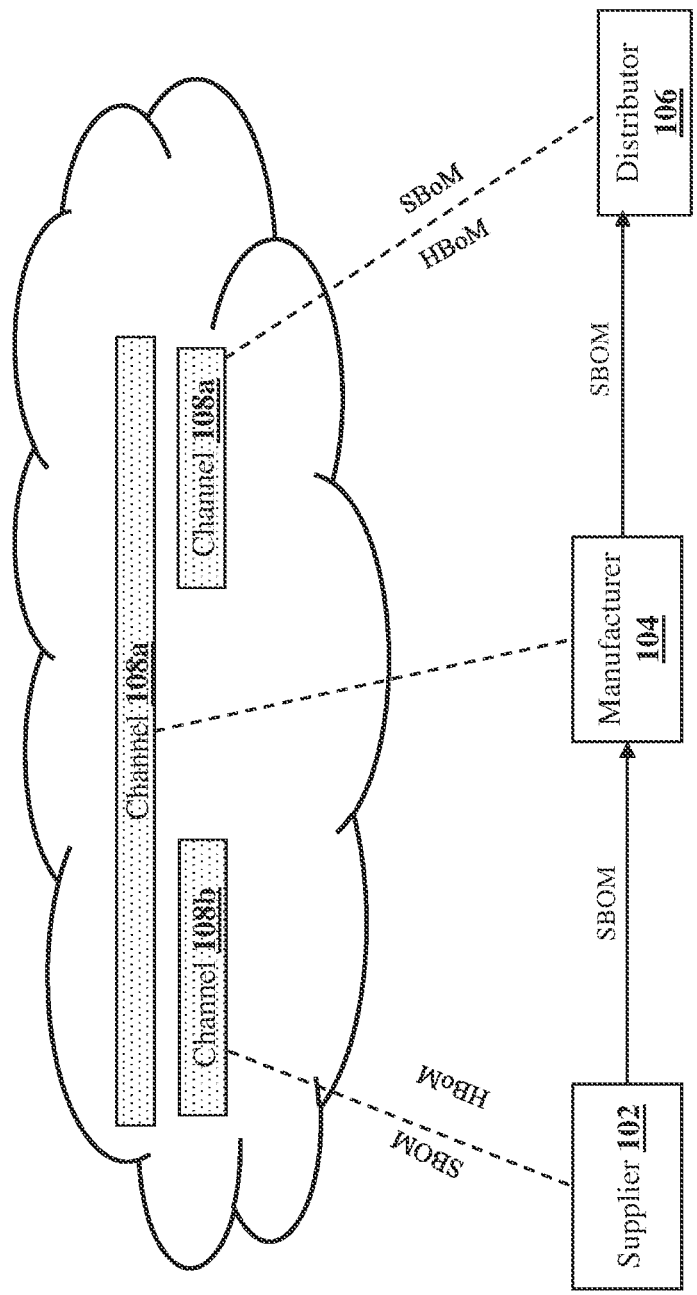
FIG. 1 is an environmental diagram illustrating hosting of Digital BoM (DBOM) nodes in blockchain premises according to prior art illustration where embodiments of the present disclosure can be implemented.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein provide a blockchain based platform and method for software supply chain lifecycle management for the creation, publishing, sharing and consumption of SBOM's or DBOM's across the software supply chain lifecycle. The SBOMs are either generated automatically from the source code of the software or existing SBOM's as input to automate the governance of the software development and delivery using blockchain smart contracts for attribution, verification, certification and the like. The embodiments of the present enclosure enable automated retrieval of information associated with a software/software's from SBOM blockchain, enable a product owner to approve or reject a software/software component based on an analysis of the software supply chain information and provides product/feature exception for customization of the software according to the developer requirements.

According to the embodiments herein, the primary features of the present disclosure is to establish a trust to a Software asset by providing various information related to software supply chain process including the ability to prove and verify it. The Output should include raw data and metadata, and should be provided in human-readable format with built in capabilities like verification of signatures. The secondary features of the present disclosure include an ability to prevent execution of untrusted software, ability to be notified about the new versions of the software or about end of support status of the software and ability to be notified about discovered security vulnerabilities and critical issues of software and its dependencies.

According to another embodiment herein, the blockchain based platform works on key assumption of trust. Different users require different level of trust. What one user may consider as not important regarding trust (i.e. missing security test entries), the other user may consider as critical. The presence of particular entry in the trust record does imply trust, for e.g.; entry provided by proven, industry-standard and certified security tool may increase trust, however entry provided by unknown security tool could mean nothing for trust (or even decrease the trust level). All participants need to have access to the system (i.e. public blockchain) to publish there their entries. The access could be direct (on-line connection) or indirect (off-line mode, where the entries are published manually). Further using the PKI infrastructure, it is possible to validate the signatures of the entries—i.e. ensure data integrity and author of the data. It is expected that in order to achieve maximal level of trust all participants are signing their actions resulting in entries in the system.

The embodiments herein apply supply chain perspective, blockchain usage perspective and traceability perspective of the software. According to the supply chain perspective, any software asset is a result of software supply chain process. The recursive/modular nature of the software is what makes this unique where a particular software asset typically depends on other software assets—either during build or runtime. This means that the Software supply chain of particular Software asset includes (sub-) supply chains of its dependencies; in a similar way, a trust in particular Software asset is composed from particular trust in its dependencies. All of this applies recursively (i.e. dependencies of dependencies, etc.). Area of hardware supply chain is similar—e.g. a smartphone (hardware) is based on other hardware modules (CPU, memory units, WIFI chips, camera, etc). The difference is that the Software supply chain does not distinguish between the types of dependencies and modules. The dependencies are Software assets on its own. Further, the blockchain technology naturally fulfils requirements needed for system of trust in Software supply chain such as transparency, immutability and decentralization. Leveraging of the blockchain technology allows to implement system of trust in Software supply chain without any trade-offs. Additionally, the system of trust in Software supply chain expects that all involved participants and tools will provide respective entries about their activity into the System. This would allow to trace and audit all of the activities related to particular Software asset. Blockchain design could be augmented to provide effective way how query for the data related to particular Software asset spread in various blocks over the time.

Referring now to the drawings, and more particularly to FIGS. 1 through 17, where similar reference characters denote corresponding features consistently throughout the figures, there are shown preferred embodiments.

FIG. 1 is an environmental diagram illustrating hosting of Digital BoM (DBOM) nodes in blockchain premises according to prior art illustration where embodiments of the present disclosure can be implemented. The participants in the supply chain can establish various attestation channels to share policy-based complementary metadata and the permissioned nature that needs to allow granular control over data access. Here, the participants comprise, but not limited to, suppliers 102, manufacturers 104 and distributors 106.

As shown in FIG. 1, a first channel 108a is configured between the three participants (i.e.) suppliers 102, manufacturers 104 and distributors 106, by which all three participants have subscribed to it. The Common Vulnerabilities and Exposures (CVEs) that are recorded on the channel by any subscriber are accessible by any other subscribers of that channel. At the same time, the second channel 108b and the third channel 108c acts as a private stream between the suppliers 102, manufacturers 104 and distributors 106, where the participants can exchange sensitive attestations such as privileged SBOMs and HBOMs.

According to the embodiments herein, the secure attestation channel scheme allows for a decentralized root of trust for the participants (i.e.) suppliers 102, manufacturers 104 and distributors 106 and provides an opportunity for third-party vendors to enrich and create metadata or attestations that would otherwise be difficult to incorporate in an approach where the metadata comes bundled with the packages.

Figure 2:
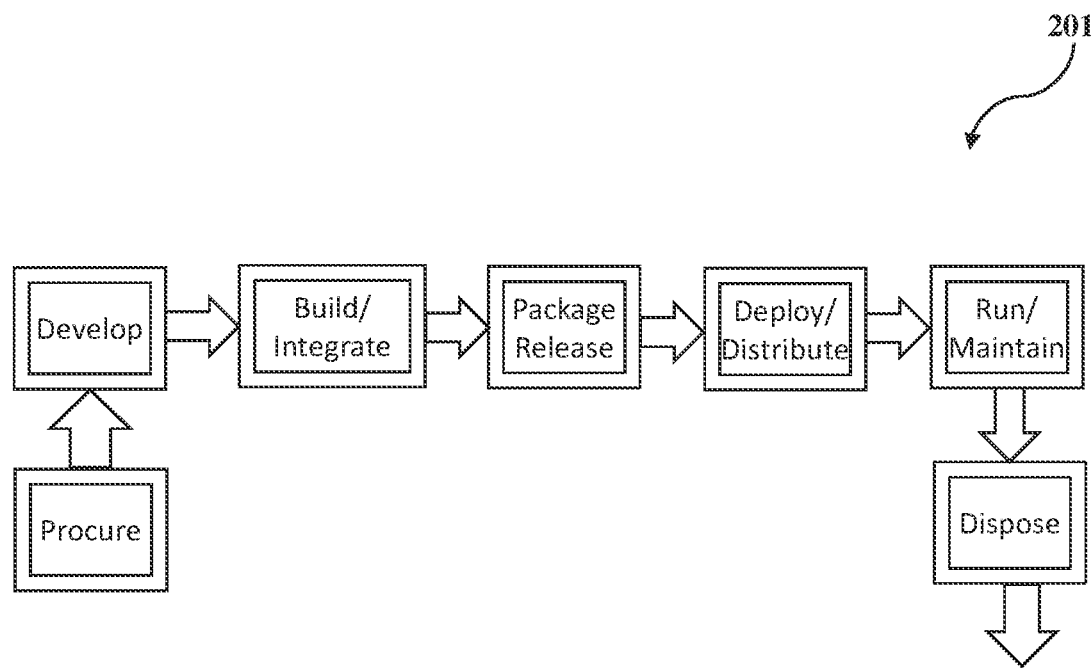
FIG. 2 is a high-level block diagram of the blockchain based SBOM platform, according to the embodiments of the present disclosure.

FIG. 2 is a high-level block diagram of the blockchain based SBOM platform, according to the embodiments herein. The blockchain platform 201 according to the embodiments herein provides a set of cloud-based SaaS capabilities/features to publish, verify, analyse and automate software supply chains in real time. The blockchain platform 201 is intended to be used by Independent software Vendors (ISV's), embedded software, open source projects, and large in-house developers of mission-critical software, for example, financial institutions such as banks.

Figure 3A:
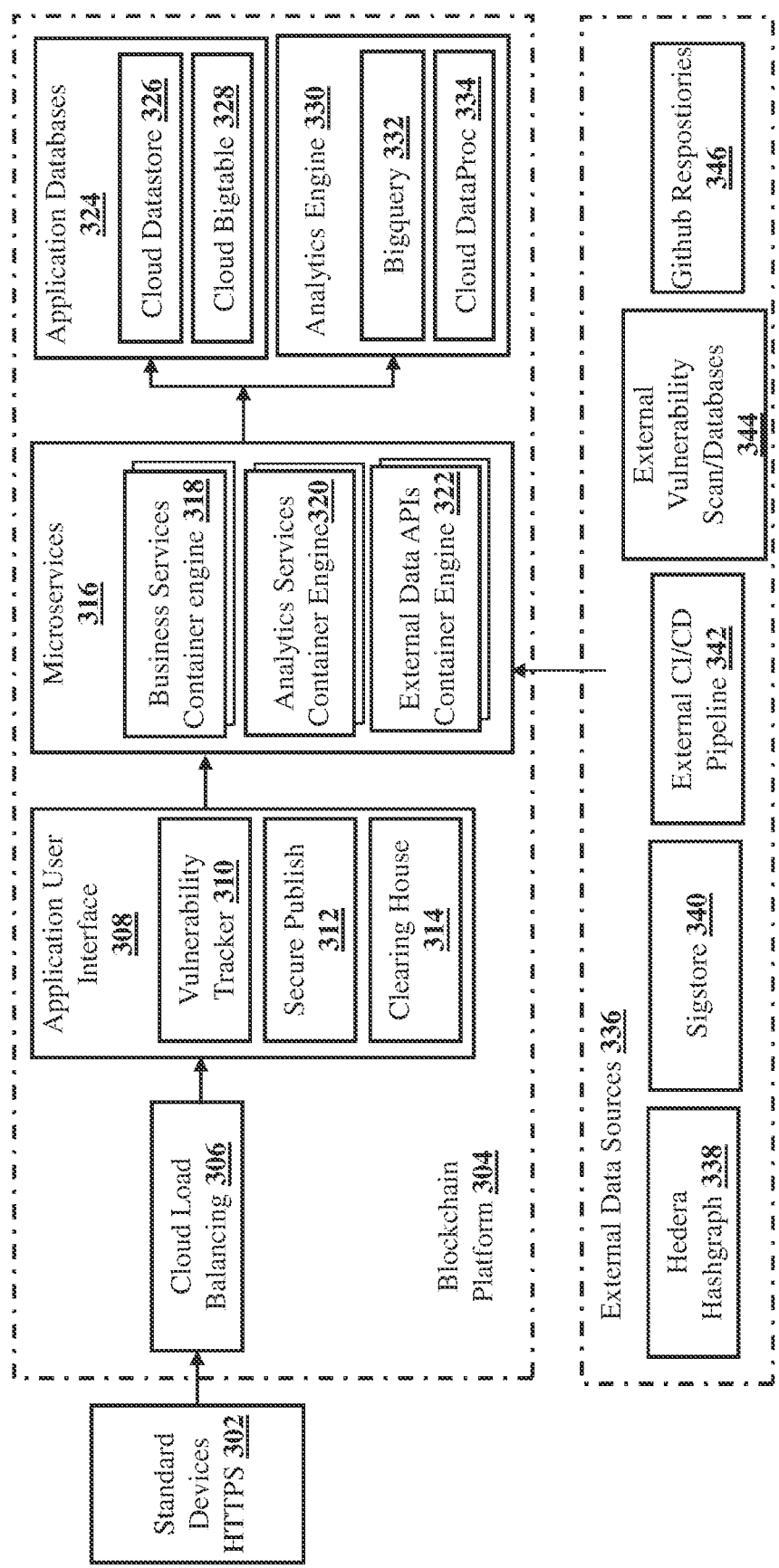
FIG. 3A is a block diagram illustrating an architecture of the blockchain platform for assessing software vulnerabilities, according to embodiments of the present disclosure.

According to the embodiments herein, the uses of the blockchain platform 201 is categorized into the following three perspectives:
  (i) Producers of software—the person/organization that creates a software component or software for use by others [develops/tests/assembles/packages/releases]
  (ii) Choosers of software—the person/organization that decides the software/products/suppliers for users [purchases/acquire/sources/selects/approves]
  (iii) Operators of software—the person/organization that operates the software component [uses/runs/monitors/maintains/defends/responds]
  Target personas within the organizations include:
  (i) Chief of Procurement/Supply Chain
  (ii) Chief of Risk/CISO/Compliance/Audit
  (iii) CIO/CTO/Head of Development
  (iv) Business Unit Owner
  (v) Product Owner
  (vi) Practitioners: Release Managers, Developers/QA/SRE's/DevOps/DevSecOps FIG. 3A is a block diagram illustrating an architecture of the blockchain platform 304 for generating Software Bill of Materials (SBOM), publishing SBOM information to blockchain and assessing software vulnerabilities, according to embodiments of the present disclosure. The blockchain platform 304 according to the present disclosure comprise of three main applications/capabilities comprising, but not limited to, secure publish 312, clearing house 314 and vulnerability and nutrition tracker 310.

According to the embodiments herein, the secure publish 312 enables organizations to generate Software Bill of Materials (SBOMs) or Digital Bill of Materials (DBOMs) (CycloneDx spec and format) and publish them to a secure, permissioned blockchain (Hedera) 338. Further, Secure publish 312 connects to external CI/CD pipeline 342 or External Git Hub repositories 346 to analyse the software packages produced by the CI/CD pipeline 342 or present in the Github repository 346 and generate the Software Bill of Materials or retrieve it if it is already produced by the CI/CD pipeline 342. The secure publish 312 application then generates a hash of the SBOM and writes it to the blockchain 338. This creates an immutable, time stamped version of the SBOM on the blockchain 338 that cannot be tampered with. The Secure Publish application 312 then stores the SBOM and hash information in the application databases 324. Writing the SBOM hash to the blockchain 338 ensures that the authenticity and origin of the SBOM can be securely verified and tied back to the original version of the software from which it was generated preventing tampering of SBOM information. This allows users of the software to be assured that information in the SBOM is accurate and matches the version they are using. The Blockchain platform 304 will automatically add timestamps and person/author stamps to published SBOM's to protect rights for software vendors/manufacturers and provide security to the consumers of the software. This will enable software vendors/manufacturers both to trace the ownership of the software packages back through the record of ownership with the help of smart contracts. The SBOM's will then become immutable, which means that the records cannot be manipulated or deleted. The SBOM's are then published to an alternate cloud-based database or SBOM/DBOM store (non-blockchain option). The blockchain platform 304 herein enables to automate the secure publish application 312 to publish SBOM for new versions of software that a company delivers to its customers in real-time by instrumenting and connecting with the external CI/CD pipeline 342. The vulnerability tracker component 310 analyses software components in the SBOM and generates a nutritional label that identifies problems with the software including security vulnerabilities by using External Vulnerability Scan/Databases 344, as well as licensing problems or any other issues with the software supply chain. This information is highlighted based on the vulnerability policies defined by the consumers of the software and is updated automatically as new vulnerabilities are identified and made available. The clearing house component 314 is used to retrieve SBOM and vulnerability information for a given version of software and electronically determine if the SBOM meets the minimum policy requirement of the requestor. Smart contract can be executed if vulnerability policy requirements. This is used by companies that buy software from a software provider to ensure that the software that they purchase and use meets the minimum vulnerability and security criteria set by the purchaser of the software so that a purchasing contract can be executed. Instead of providing this information manually to each customer, the software producer can use the Clearing House 314 component to automate this process and provide this information in a centralized platform to all customers through the application.

Figure 3B:
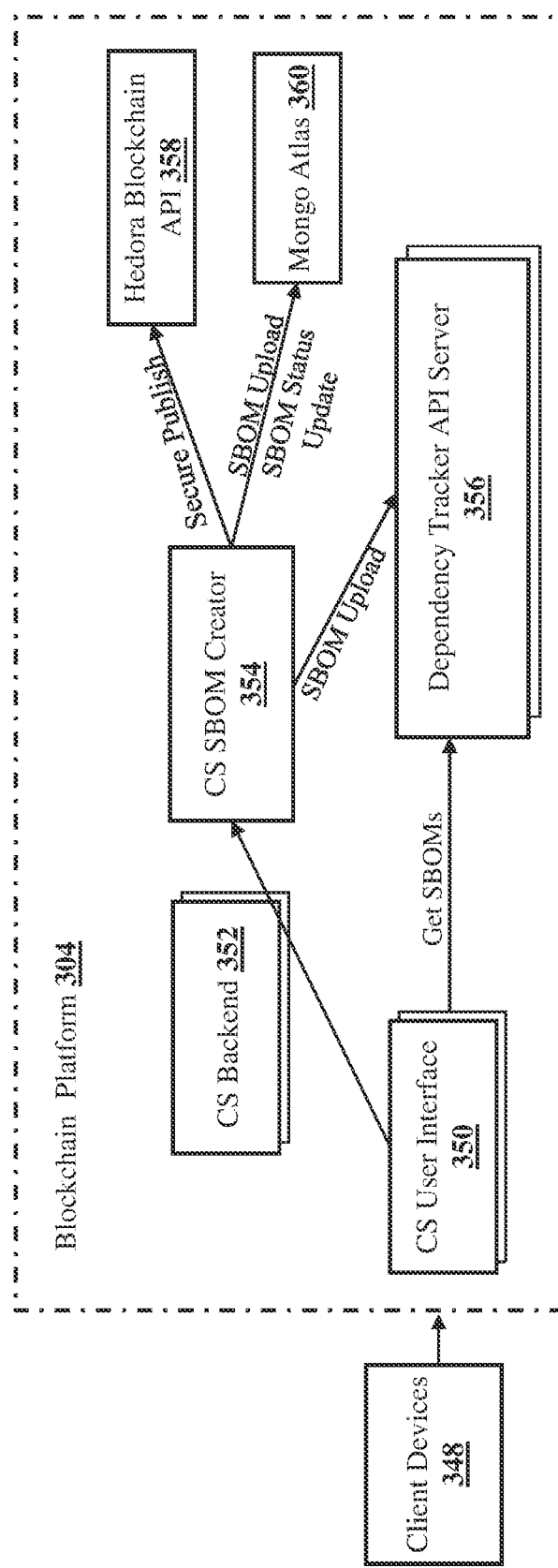
FIG. 3B is a block diagram illustrating implantation of the blockchain based platform in a Clearing House application, according to the embodiments of the present disclosure.

FIG. 3B is a block diagram illustrating implementation of the blockchain based platform in a Secure Publish application, according to the embodiments herein. The CS SBOM Creator 354 generates or retrieves the SBOM information from external sources CS user interface 350 or the CI/CD pipeline, and then uses the Blockchain API 358 to publish it to the blockchain. The SBOM creator can also use external source including but not limited to Dependency Tracker 356 to analyze the SBOM and identify vulnerabilities.

The clearing house application allows software consumers to analyse a software package for supply chain information (nutrition label), decide if a software package meets the minimum policy requirements for compliance based on provenance, licensing, vulnerability and security criteria set by the company, decide if a third-party software component can be approved for use in the company's applications based on policy and compliance rules, identify current vulnerabilities and potential remediation for software in use by the company (including dependencies).

According to the embodiments herein, the blockchain based platform can be used in Vulnerability and Nutrition Tracker application. The Vulnerability and Nutrition Tracker application allows software consumers to monitor vulnerabilities that arise in the software packages or their dependencies in use by the company in real-time. Further, the Vulnerability and Nutrition Tracker application identify the software packages in use by the company which are impacted by the vulnerability, identify and assess risk/impact of vulnerability to the company, identify potential remediation measures and track remediation until vulnerability is resolved.

According to the embodiments herein, the platform herein functions based on the core principles such as OSS First and Cloud Native First, Enterprise first and ready platform (regulatory industries, compliance/audit ready), Switzerland philosophy for supporting platforms and tools, permissioned first and also with permissionless support, world class customer success and support, highly intuitive experience (onboarding and ongoing usage) and extending the capability to be available as REST API/service.

According to an embodiment herein, a digital/software supply chain, program everything to record all verified transactions or activities related to creating a new application or a service in a blockchain. Here, digital IDs or digital passports are created for every asset to authenticate key information such as who developed the code, API, which open source library was used, etc. Each recorded transaction for every asset in the supply chain includes a time stamp, so that provenance can be easily added to the application. The embodiments of the present invention allow to identify and verify who developed a software component, verify quality and security, verify API's, verify the history for provenance, compliance and audit.

Figure 4:
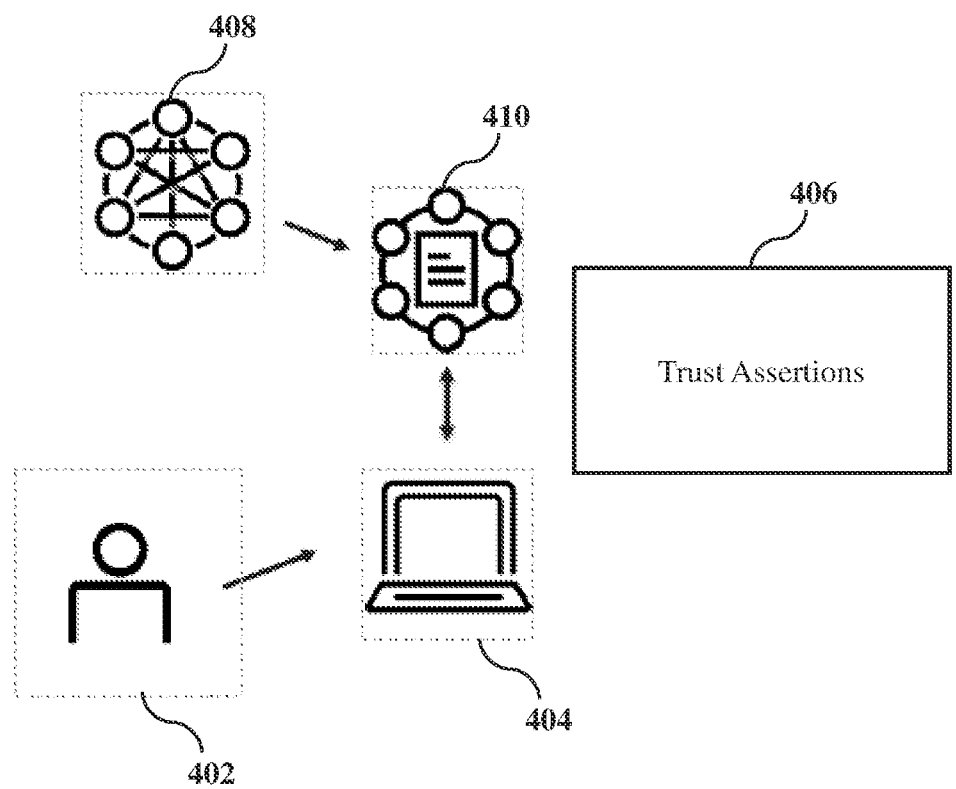
FIG. 4 is a block diagram illustrating execution of smart contracts, according to an example embodiment of the present disclosure.

FIG. 4 is a block diagram illustrating execution of smart contracts, according to an example embodiment of the present disclosure. Here, the user 402, through the blockchain platform 404 validates a set of trust assertions 406 automatically via a target runtime such as operating system 408, browser, API client, and the like against Execution Smart Contract before any software is run. If the expected trust assertions 406 are met, then the smart contract 410 is executed, otherwise execution of the smart contract 410 is prevented. Optionally, the user 402 may define own trust assertion policies to define how strict or relaxed the trust assertions are.

Figure 5:
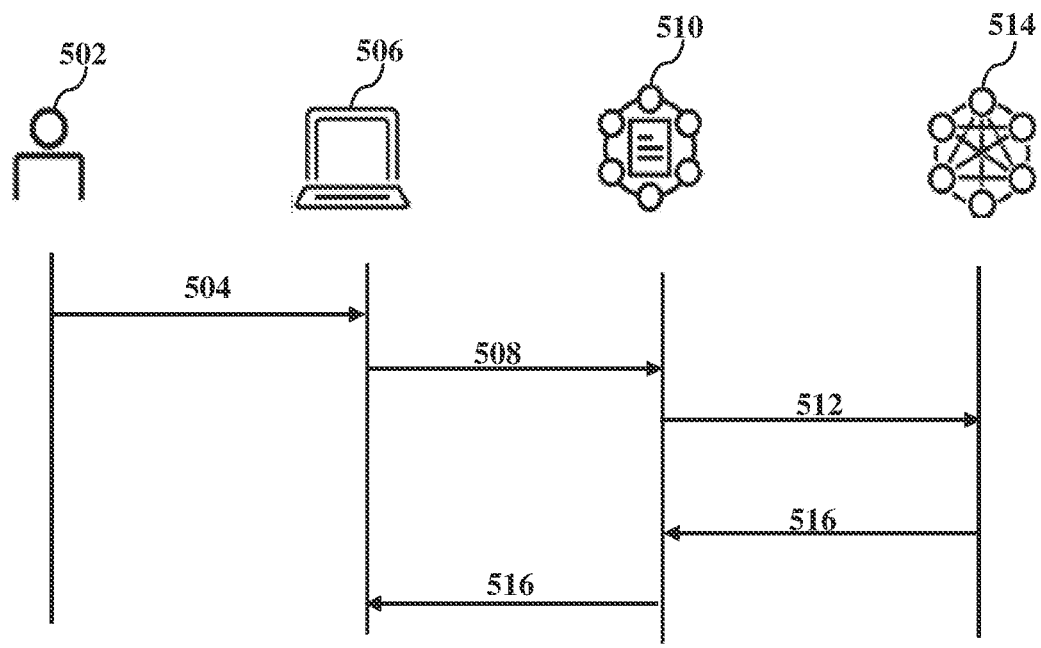
FIG. 5 is a flow diagram illustrating a process of execution of smart contracts, according to example embodiments of the present disclosure.

FIG. 5 is a flow diagram illustrating a process of execution of smart contracts, according to example embodiments of the present disclosure. At 504, the user 502 accesses a particular software assets. Optionally, the user may select expected trust assertions that needs to be met on the target platform when the software is executed. At 508, the blockchain platform 506 initiates a call to Execution Smart Contract 510 to evaluate a set of trust assertions before the software is executed. At 512, the smart contract 510 uses data stored in the system 514 to evaluate trust assertions and at 516, a response of the evaluation is sent back to the blockchain platform 506.

Figure 6:
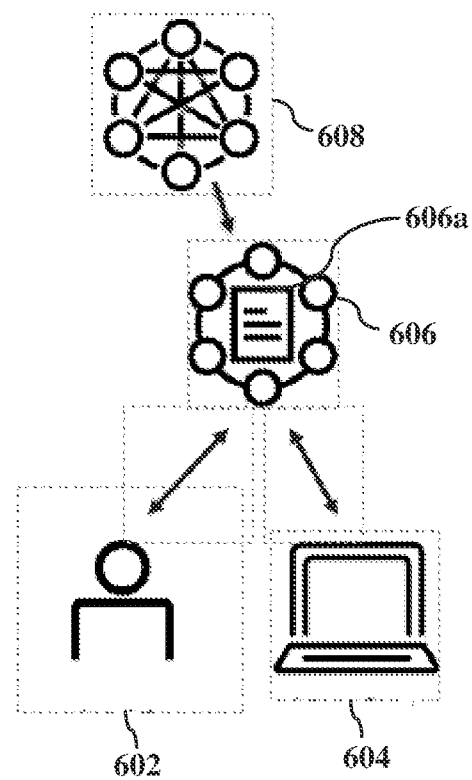
FIG. 6 is a block diagram illustrating an audit smart contract process, according to an example embodiment of the present disclosure.

FIG. 6 is a block diagram illustrating an audit smart contract process according to an example embodiment of the present disclosure. Any time, any user 602 or any service 604 can ask for Trust records report 606a about a particular software asset via Audit Smart Contract 606. Such Trust records are extracted from the raw data from the System 608 (e.g. all data and meta-data in JSON format) which is suitable for machine processing or it could have a form of user-friendly formatted report including only items that are meaningful for end user. In addition, trust records report 606a may provide built-in validation of signatures and give a specific warnings, recommendations and hints for the parts that could affect trust in a particular software asset. Furthermore, the audit smart contracts 606 are used during the time of installation, deployment or first use of the software asset so that it is possible to review Trust record report 606a in the moment of installation, deployment and first use.

Figure 7:
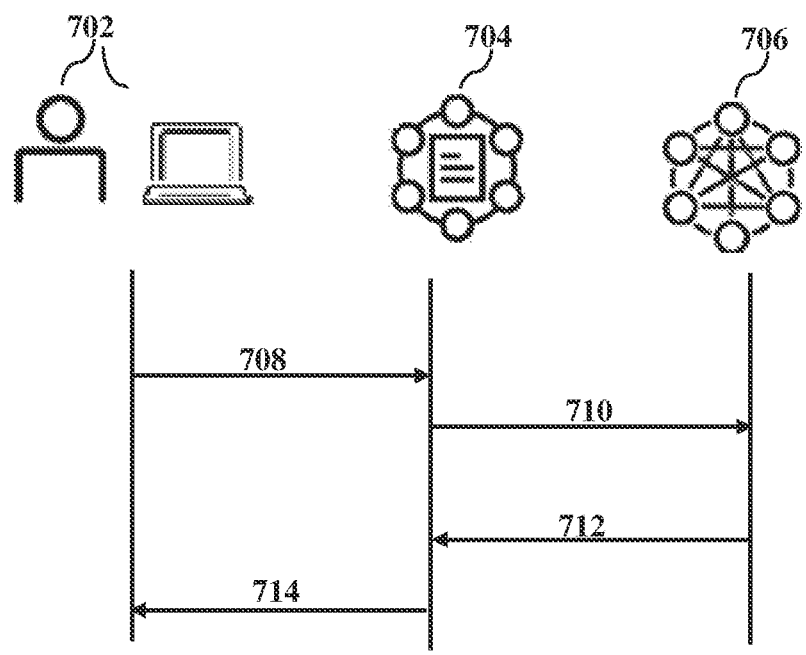
FIG. 7 is a flow diagram illustrating a process of audit smart contracts, according to example embodiments of the present disclosure.

FIG. 7 is a flow diagram illustrating a process of auditing smart contracts, according to example embodiments of the present disclosure. At 708, the user or service 702 requests the trust record reports. At 710, the smart contract 704 reads data required for generating trust records report from the code repository (not shown). At 712, the system 706 returns the read data to the smart contract 704 and the smart contract 704 returns the trust records report back to the user/service at 714.

Figure 8:
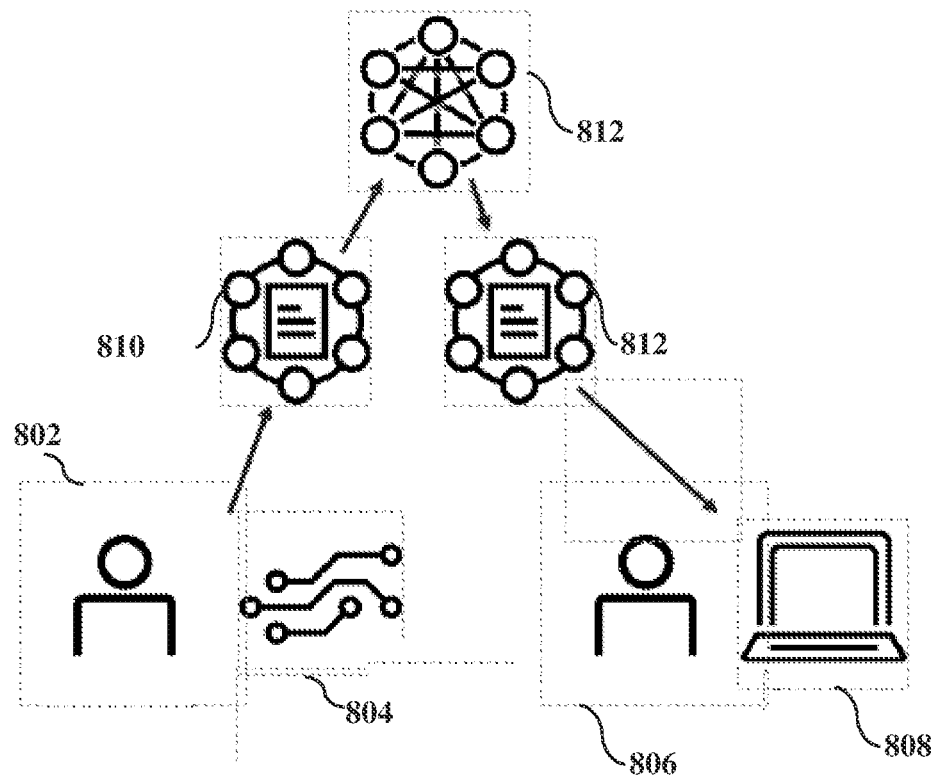
FIG. 8 is a block diagram illustrating an announcement of smart contract, according to an example embodiment of the present disclosure.

FIG. 8 is a block diagram illustrating an announcement of smart contract, according to an example embodiment of the present disclosure. The developer 802 explicitly release infrastructure 804 (automatically) publish information about the new release (i.e. the new version) of the software asset via Promotion Smart Contract 810. Announcement Smart Contract 812 notifies the users 806 or any other interested parties 808 about the availability of the new release using the blockchain platform via e-mail, services via registered callback about the availability of the new release. Similar scenario applies for the case when end of support of a particular version of software asset is announced.

Figure 9A:
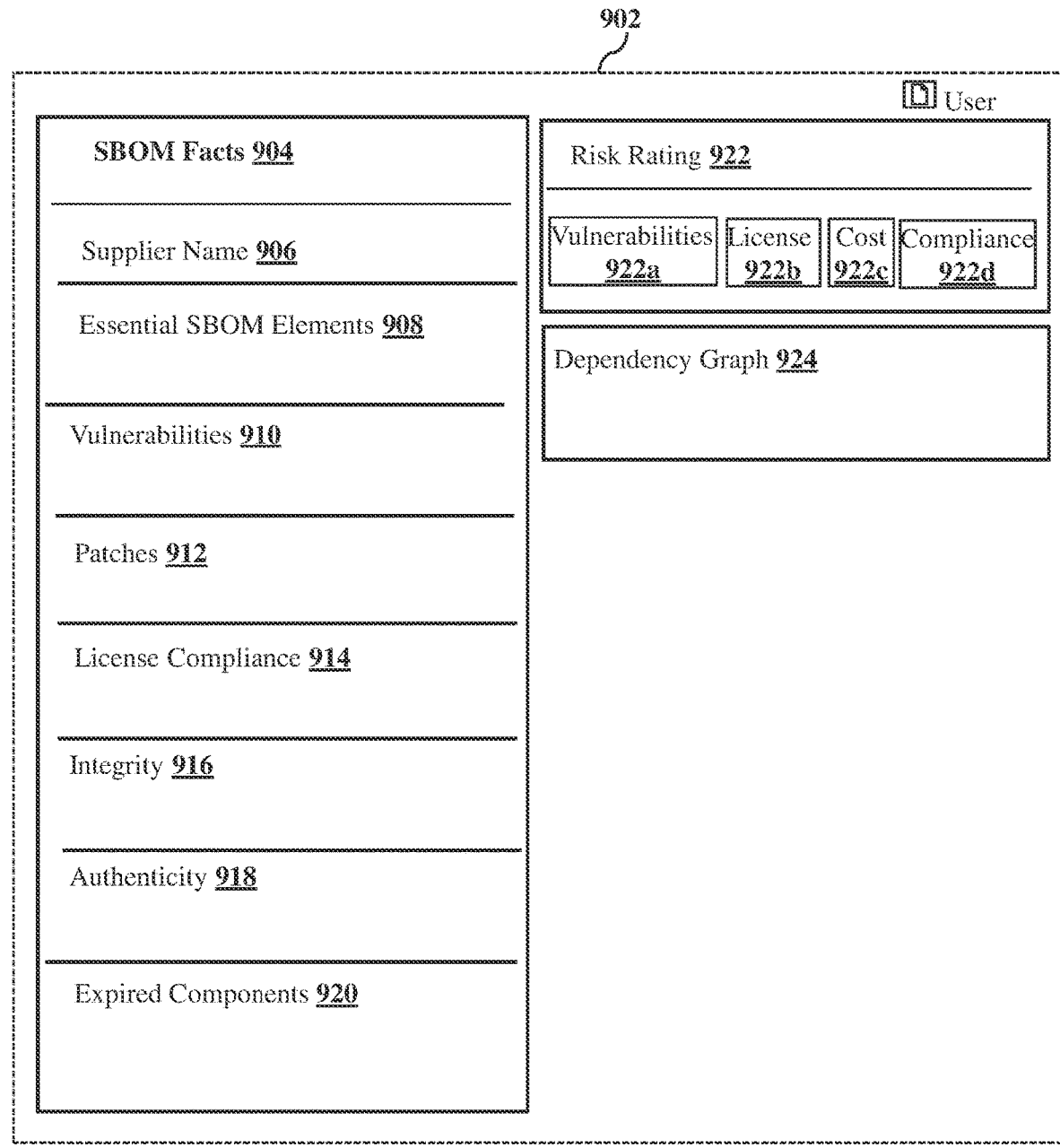
FIG. 9a is a schematic diagram illustrating a user interface of a user device, according to an example embodiment of the present disclosure.

FIG. 9a is a schematic diagram illustrating a user interface 902 of a user device, according to an example embodiment of the present disclosure. The user interface 902 depicts the various facts associated with the SBOM to the user 9. The SBOM facts 904 essentially comprises, but not limited to, supplier name 906, essential SBOM elements 908, Vulnerabilities 910, Patches 912, license compliance 914, integrity 916, authenticity 918, expired components 920 and the like. The user interface 902 further demonstrates a risk rating/factors 922 of the software assets and a dependency graph 924. The risk factors 922 associated with the SBOM is then determined based on the percentage of the SBOM facts and its impact on the SBOM functionalities. Here the risk factors 922 comprises, but not limited to, vulnerabilities 922a, licenses 922b, costs 922c, compliance 922d, and the like.

Figure 9B:
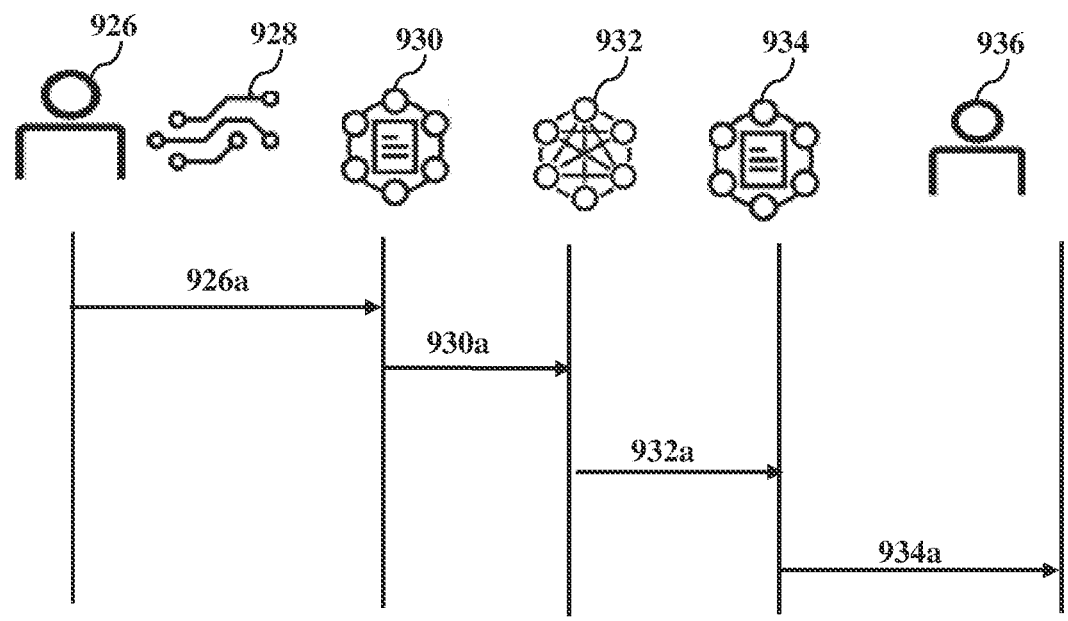
FIG. 9b is a flow diagram illustrating a process of announcement of smart contracts, according to example embodiments of the present disclosure.

FIG. 9b is a flow diagram illustrating a process of announcement of smart contracts, according to example embodiments of the present disclosure. At 926a, the developer 926 or Release infrastructure 928 (automatically) submits the new version release to the system 932 through a promotion audit contract 930. At 930a, the promotion audit contract 930 writes the new release information to the system 932. At 932a, the system 932 triggers an execution smart contract 934 and at 934a, the announcement smart contract notifies the users 936 interested parties about the release of the new version of the smart contract 934.

Figure 10:
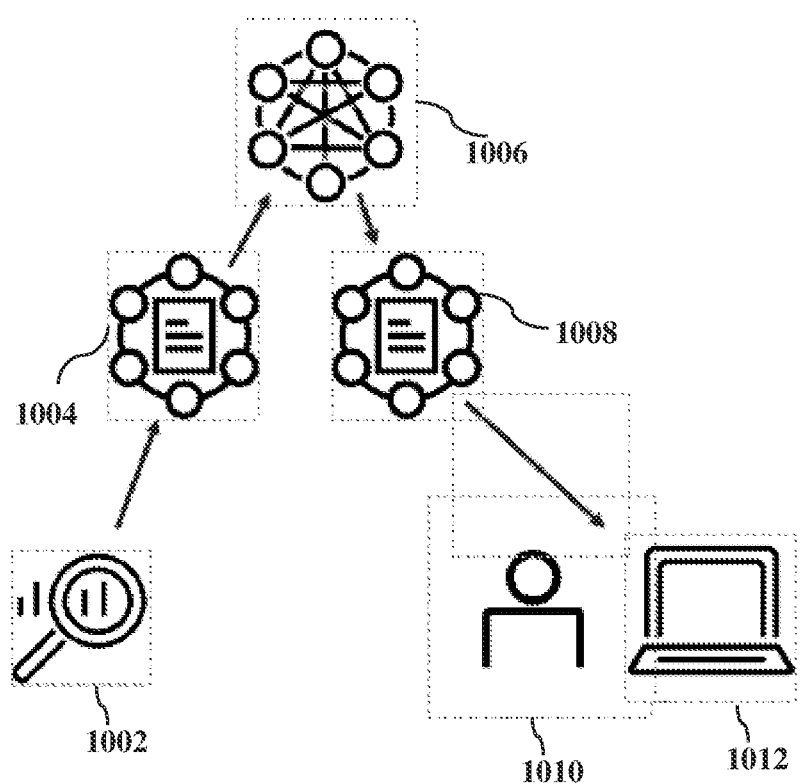
FIG. 10 is a block diagram illustrating alert smart contract, according to an example embodiment of the present disclosure.

FIG. 10 is a block diagram illustrating alert smart contract, according to an example embodiment of the present disclosure. The security research module 1002 performs a security vulnerability research and alerts the smart contract 1004 if in case security vulnerabilities associated with any software asset in the SBOM is identified. The smart contract 1004 intimates the identified security vulnerability to the blockchain system 1006 and the blockchain system 1006 in turn triggers the alert smart contract 1008. The alert smart contract 1008 further notifies all interested users 1010 via e-mail, services via registered call-back calls about the risks discovered in relation to a particular software asset using the blockchain platform 1012. The risk means when end of support date announced for the particular software asset is reached. Alternatively, the Alert Smart Contract 1008 is triggered, when software asset is marked with security vulnerability, mutually agreed and pre-set by the security authorities.

Figure 11:
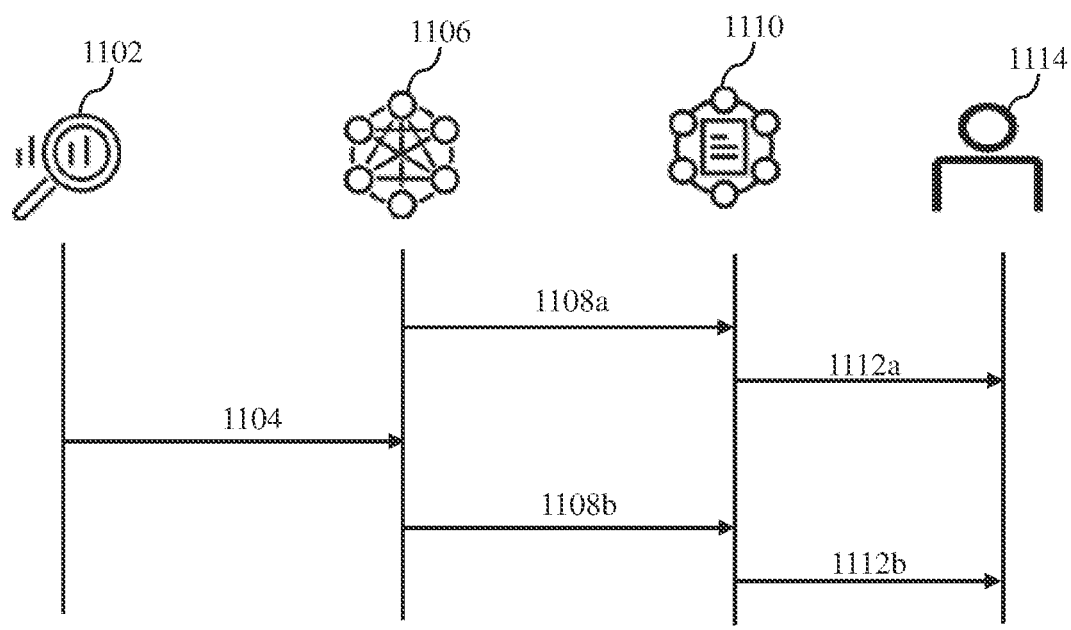
FIG. 11 is a flow diagram illustrating a process of alert smart contracts, according to example embodiments of the present disclosure.

FIG. 11 is a flow diagram illustrating a process of enabling alert smart contracts, according to example embodiments of the present disclosure. At 1104, the software asset is marked with security vulnerability at 1104, if a security vulnerability is identified during the security analysis/research 1102. At 1108*a*-1108*b*, the system 1106 triggers the audit smart contract 1110 when end of support day is reached. At 1112*a*-1112*b*, the users 1114 of the software asset or any interested parties is notified about the identified risk through the audit smart contract 1110. The users 1114 or interested parties can then initiate appropriate measure to overcome the security vulnerability.

Figure 12A:
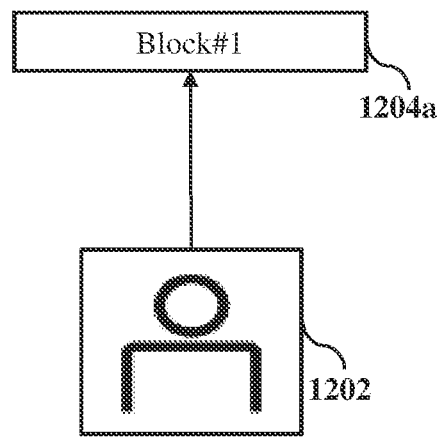
FIGS. 12a-12g are block diagrams illustrating a system of trust during software development flow according to example embodiments of the present disclosure.
Figure 12B:
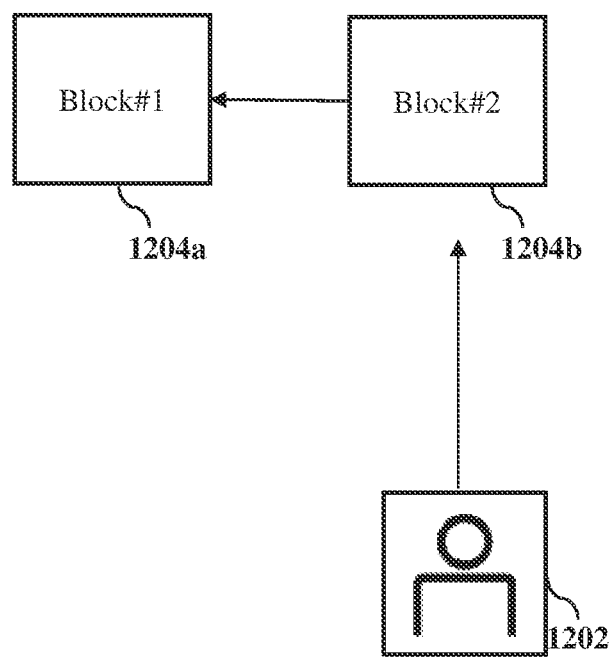

FIGS. 12*a*-12*h* are block diagrams illustrating a system of trust during software development flow according to example embodiments of the present disclosure. In FIG. 12*a*, the developer 1202 registers new software asset in the system. New unique ID 1204*a* for the software asset is generated. The developer 1202 then assigns one or more code repositories for a particular software asset through the code blocks 1204*a*-1204*b* as shown in FIG. 12*b*. Further, any change to the code in the code repository 1206 is tracked.

Figure 12C:
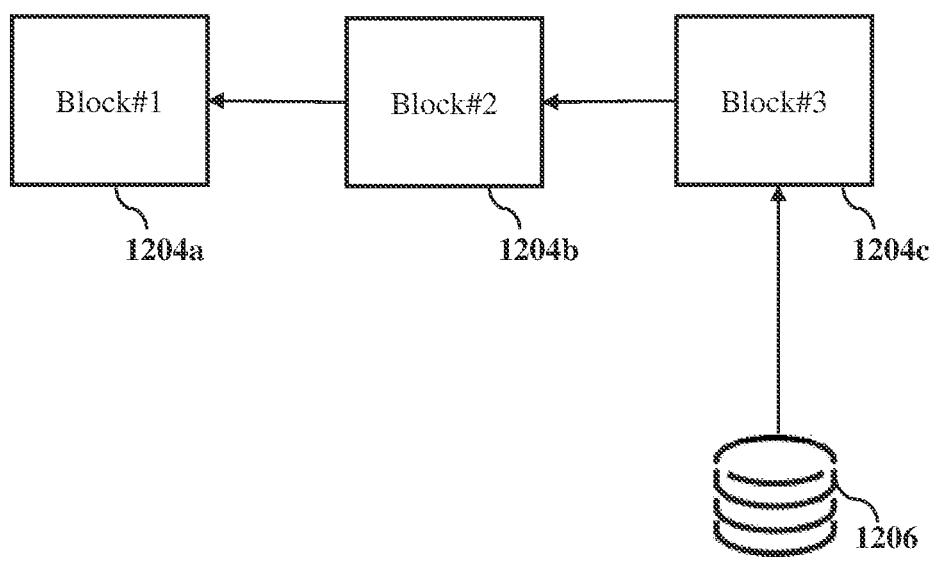
Figure 12D:
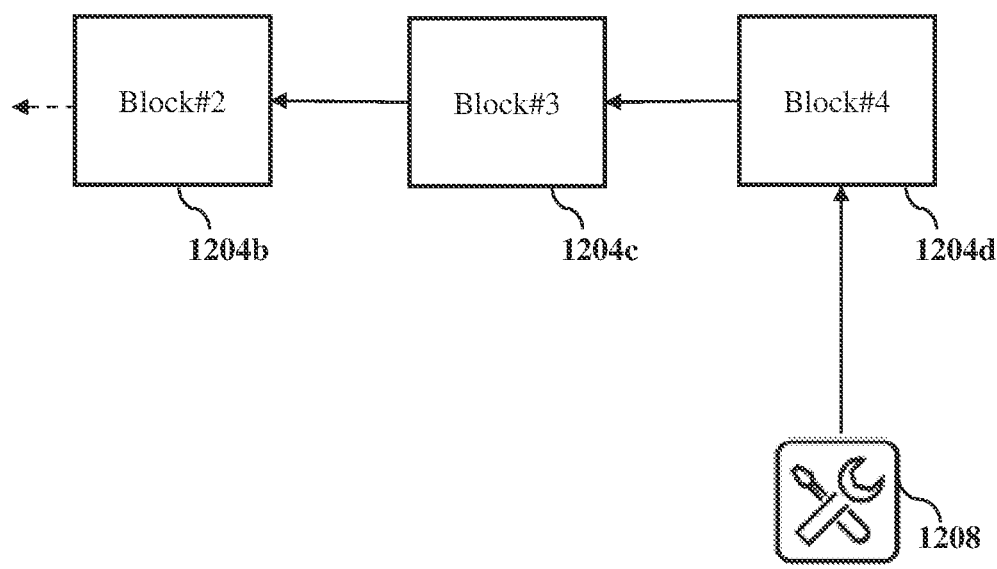
Figure 12E:
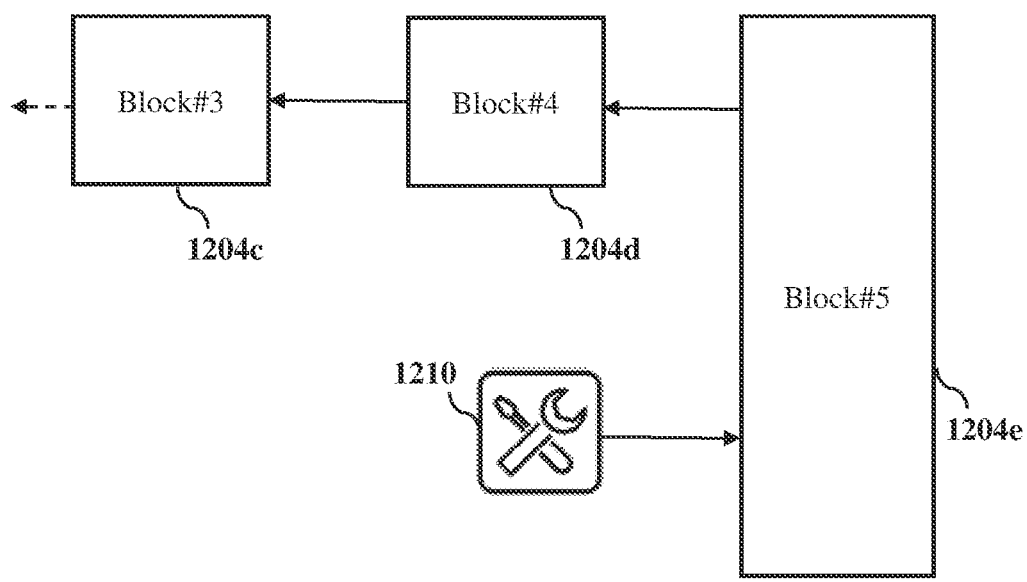
Figure 12F:
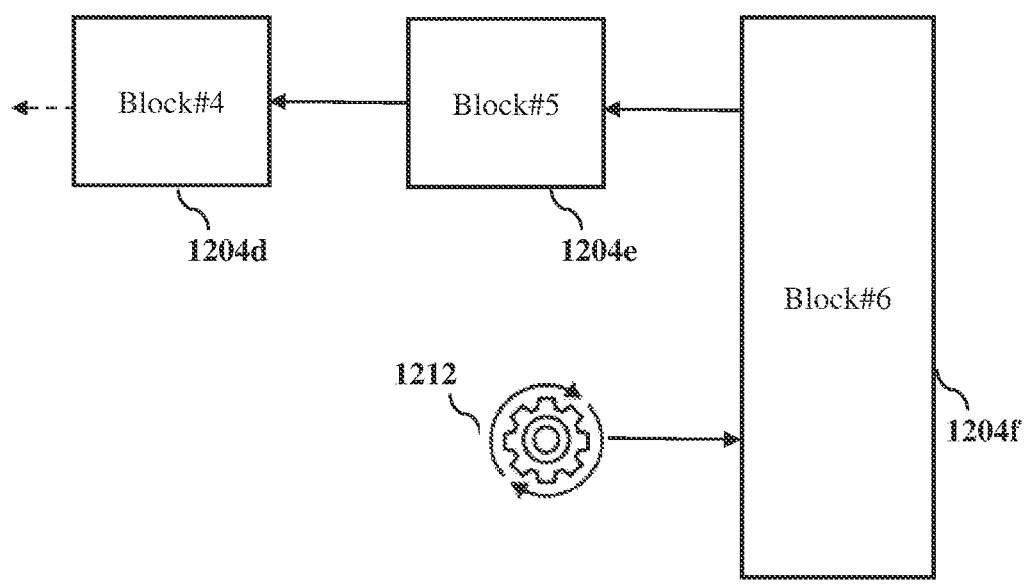
Figure 12G:
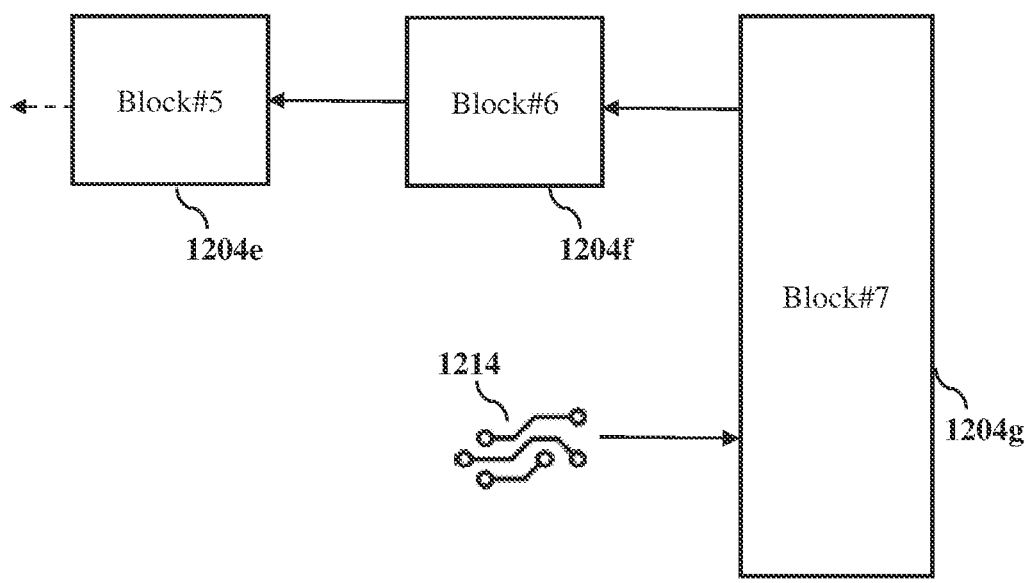

The code repository 1206 pushes any change reference, author, change description and timestamp into the system through the code blocks 1204-1204*c*, as shown in FIG. 12*c*. Here, hash is used for integrity check between the metadata and data stored off the blockchain. In FIG. 12*d*, a Static code analysis is initiated, results and details are stored in the system by astatic code analysis engine 1208. Code analysis of the codes stored the code blocks 1204*b*-1204*d* is performed using policies that follow given standardization, for instance, based on how strict the analysis is: basic, medium, strict, etc. Here, hash is used for integrity check between the metadata and data stored off the blockchain. In FIG. 12*e*, the build of the code is run by executing the code blocks 1204*c*-1204*e* and information about the build is stored by the build infrastructure 1210. Additionally, information about all dependencies is stored, including their software asset ID which enables to traverse the dependency tree. A set of tests is run and all the performed test results are stored by the test engines in the system. The reference between a particular build and test results are stored in the cost analysis engine 1208 (as the tests are performed against particular build). Security test is performed using policies that follows given standardization (for e.g. the policies defines how strict the analysis is: basic, medium, strict etc). FIG. 12*f* illustrates interaction of system of trust during development flow. The test infrastructure 1212 runs a set of tests by executing codes in code blocks 1204*d*-1204*f* and all the performed test results are stored by the code analysis engines 1208 in the system. Here security test is performed using policies that follow a given standardization (for e.g. the policies define how strict the analysis is: basic, medium, strict etc). In FIG. 12*g*, release of the software asset is performed. A Release infrastructure 1214 provides information related to the release into the system. The information related to the release into the system stored in the ode blocks 1204*e*-1204*g*, comprises, but not limited to, public version, vendor, signature of the package, ID of the build used for particular release, supported platforms, reference to related documentation and details about compliance with standards.

Figure 13A:
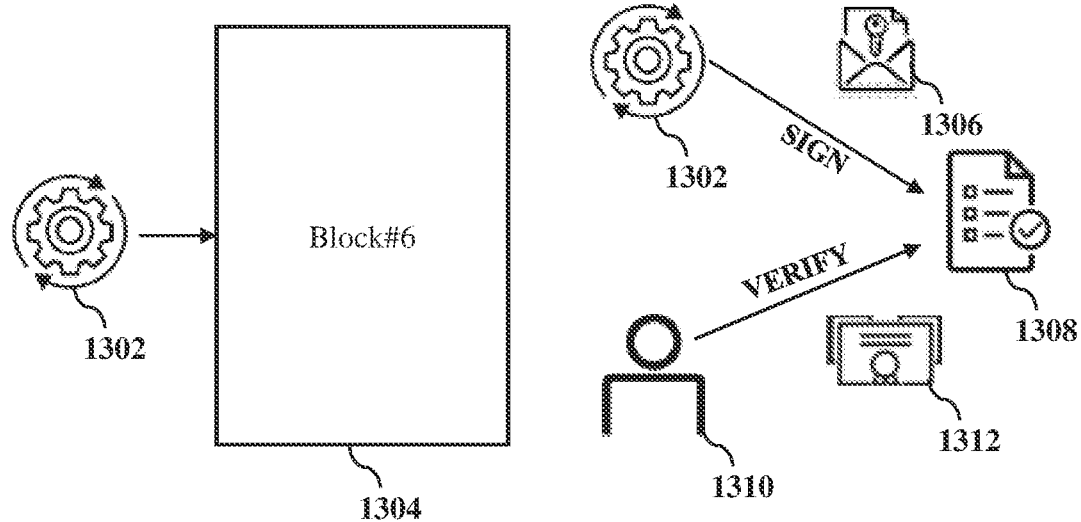
FIGS. 13a-13b are block diagrams illustrating the process of verifying the authenticity of records in the system, according to example embodiments of the present disclosure.
Figure 13B:
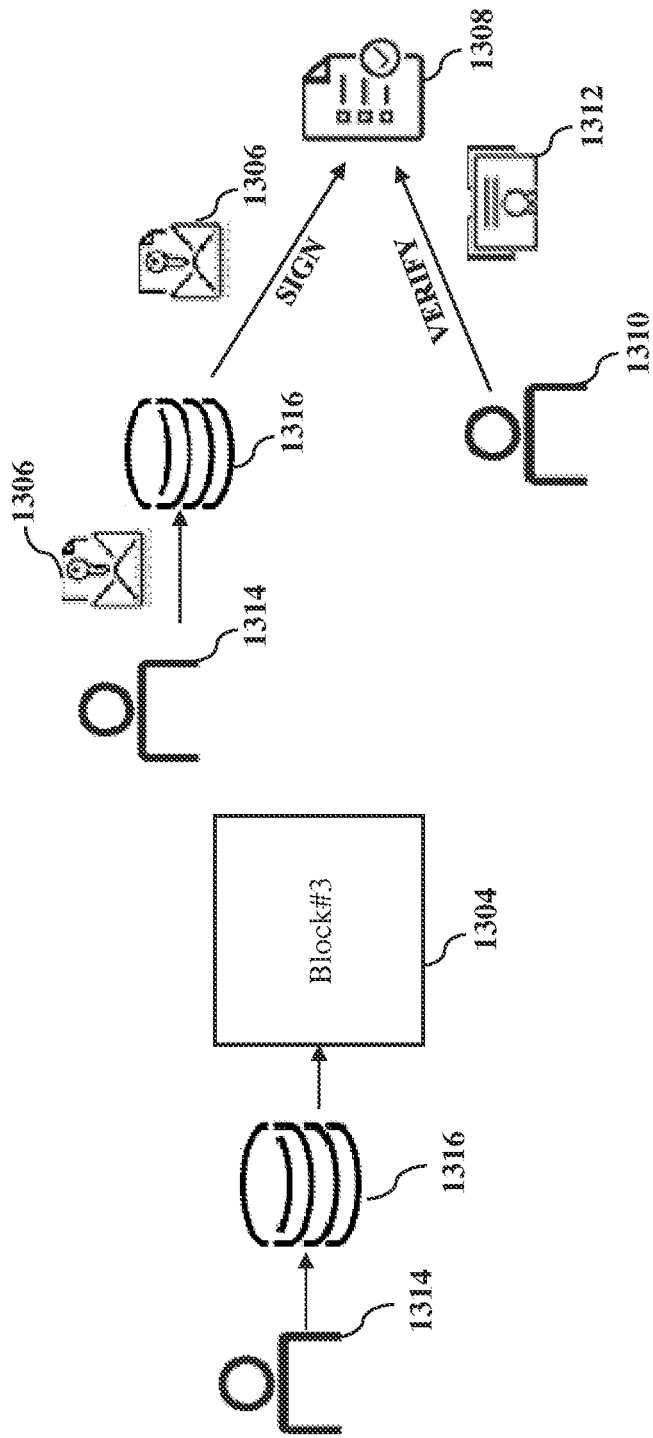

FIGS. 13*a*-13*b* are block diagrams illustrating the process of verifying the authenticity of records in the system, according to example embodiments of the present disclosure. In FIG. 13*a*, the Veracode security testing engine 1302 publishes test entry into the blockchain 1304 and signs hash of the data 1308 (including unique triple Software asset UID, BuildID and timestamp) by its private key 1306, according to an example herein. End user 1310 may validate this entry using Veracode's certificate 1312 and prove that the entry was not altered or forged completely by a malicious party and it is really coming from the Veracode security testing engine 1302. So, it is possible to prove anytime that Veracode security testing engine 1302 made the test, against build and all other data (test result, date, etc.

In another embodiment, as illustrated in FIG. 13*b*, the repository 1316 publishes changes about every code change pushed to the repository 1316. It is expected that every code change is signed by the developer 1314 and that the repository 1316 keeps track about who is contributing to the repository 1316. In addition, all of the entries added to the system by repository are signed by the repository 1316. So, it is not possible to alter or forge entries published in the system but it is possible to verify that they are coming from expected repository where the repository 1316 guarantees that only code changes signed by developers 1314 are present there.

According to the embodiments herein, at the end of the development flow of a particular release of a Software asset, the summary entry might be inserted into the system to capture and aggregate all the important data from the previous steps spread in various blocks over the time and make summarized claims about the trust (e.g. All possible tests and audits have been executed. A single query will return information needed to establish trust into the software asset. Conceptually, the level of trust is very individual while one consumer of the software asset would have trust just because the software asset is coming from trusted vendor, the other one might require all the data stored in the system to evaluate whether to trust in the software asset or not. In fact, the trust is a subject of individual interpretation of the data in the system (that may provide various clues and hints like validation of the entries authenticity, etc.) The summary entries will lead to data redundancy.

Figure 14:
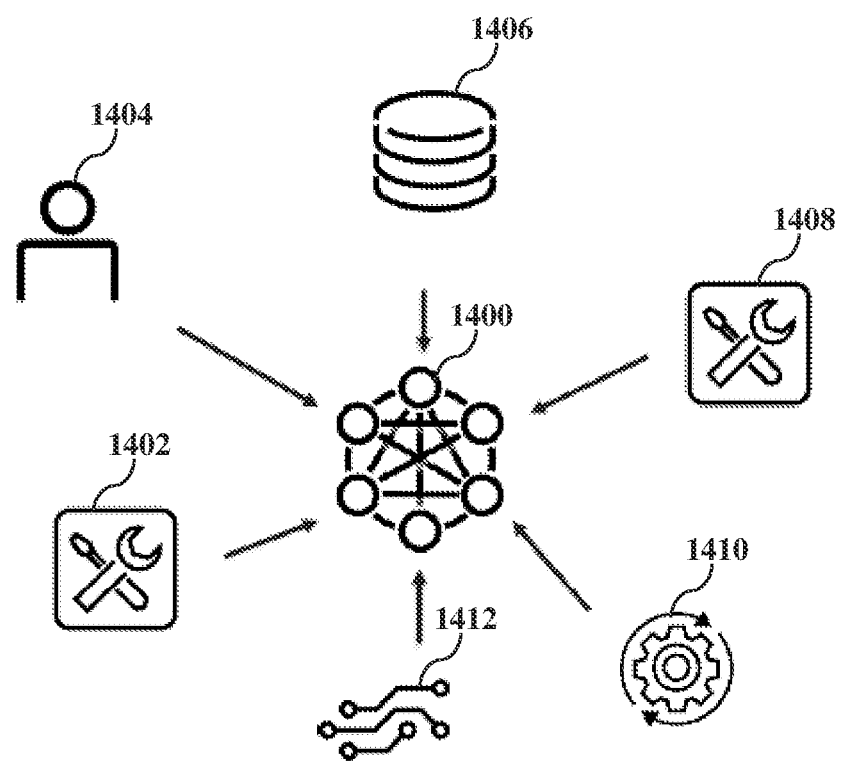
FIG. 14 is a block diagram illustrating a process of building Consensus among Participants responsible for publishing data into system, according to an example illustration of the present disclosure.

FIG. 14 is a block diagram illustrating a process of building Consensus among participants responsible for publishing data into system, according to an example illustration of the present disclosure. The system 1400 is accessed by various participants to provide data about the particular software asset. Here the various participants could be code analysis engine 1402, developers 1404, data repositories 1406, build infrastructure 1408, test Infrastructure 1410 and release infrastructure 1412. It is a responsibility of each of the participant to provide required data into the system. Given that these participants may be distributed, usage of consensus mechanisms like RAFT or PAXOS can be used to validate submissions on the blockchain.

Figure 15:
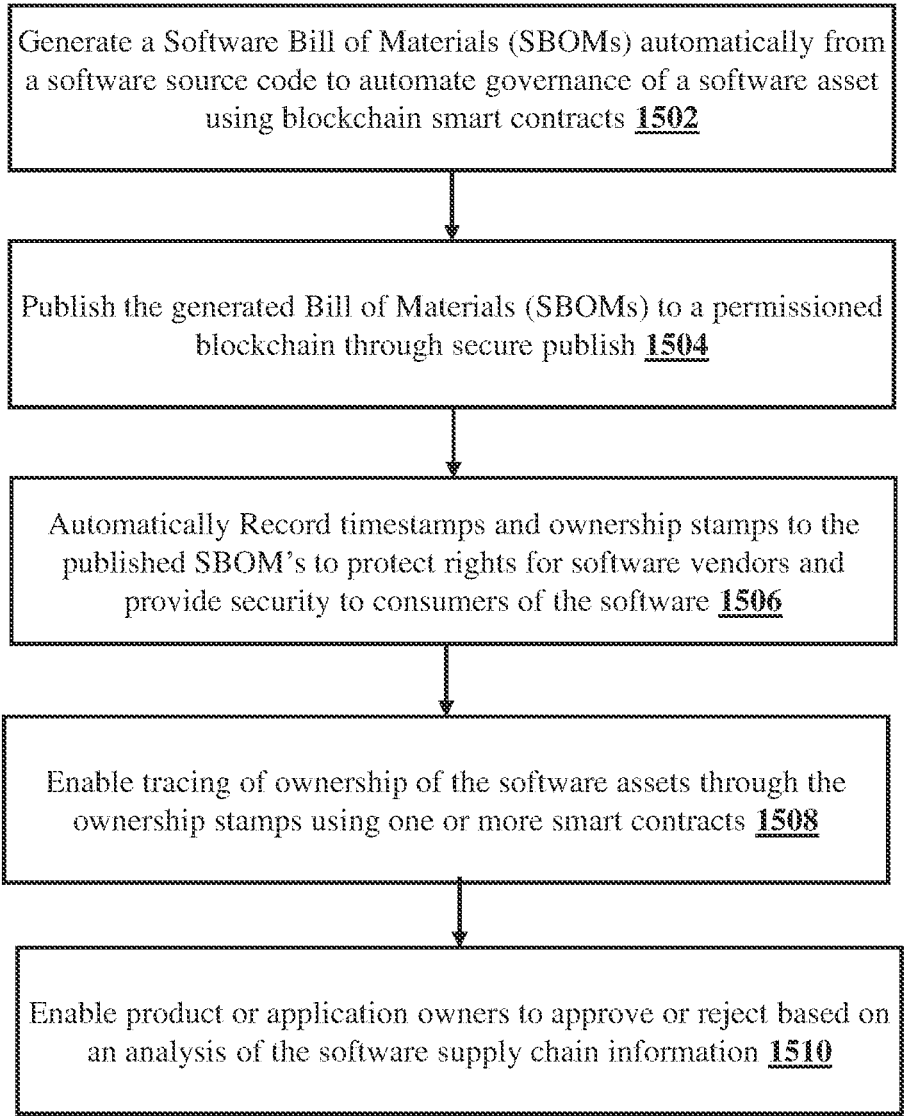
FIG. 15 is a flow diagram of a method of assessing Software Bill of Materials (SBOM) across a software supply chain life cycle over a blockchain platform, according to the embodiments of the present disclosure.

FIG. 15 is a flow diagram of a method of assessing Software Bill of Materials (SBOM) across a software supply chain life cycle over a blockchain platform, according to the embodiments of the present disclosure. At step 1502, a Software Bill of Materials (SBOMs) automatically from a software source code to automate governance of a software asset using blockchain smart contracts is generated. At step 1504, the generated Bill of Materials (SBOMs) is published to a permissioned blockchain through secure publish. At step 1506, timestamps and ownership stamps to the published SBOM's are automatically recorded to protect rights for software vendors and provide security to consumers of the software. At step 1508, tracing of ownership of the software assets through the ownership stamps using one or more smart contracts is enabled. At step 1510, product or application owners to approve or reject based on an analysis of the software supply chain information is enabled.

Figure 16:
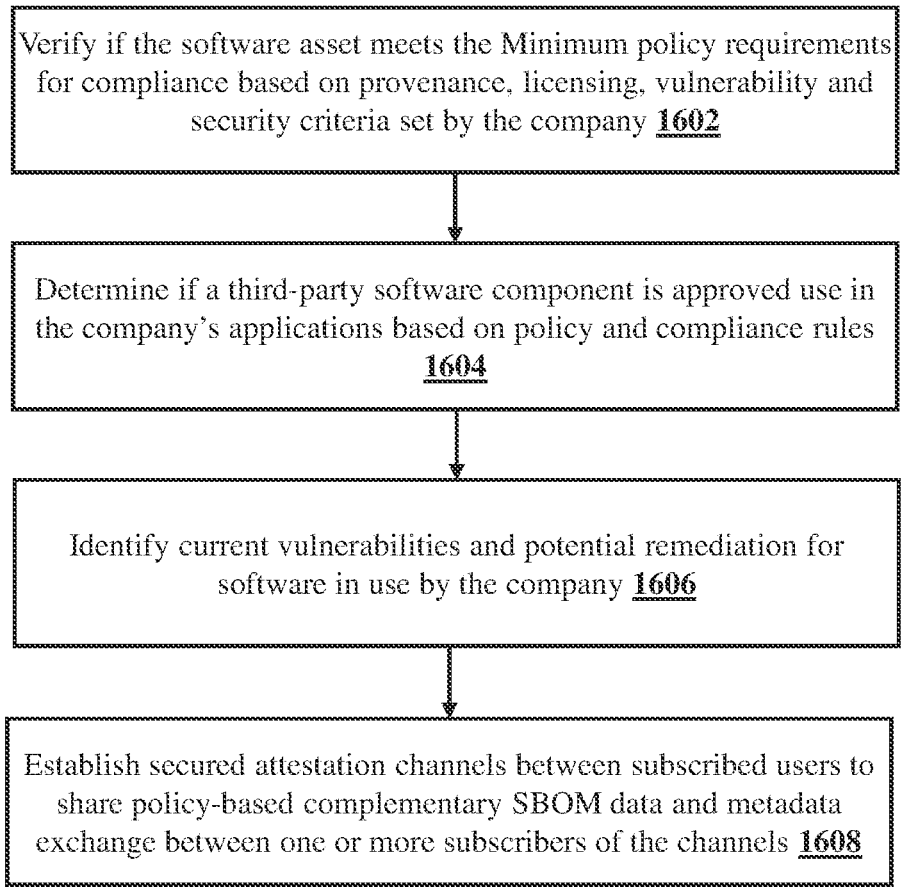
FIG. 16 is a flow diagram of a method of analysing the software supply chain information, according to the embodiments of the present disclosure.

FIG. 16 is a flow diagram of a method of analysing the software supply chain information, according to the embodiments of the present disclosure. At 1602, it is verified if the software asset meets the minimum policy requirements for compliance based on provenance, licensing, vulnerability and security criteria set by the company. At 1604, if a third-party software component is approved for use in the company's applications based on policy and compliance rules and identify current vulnerabilities and potential remediation for software in use by the company is determined at 160. At 1608, secured attestation channels between subscribed users to share policy-based complementary SBOM data and metadata exchange between one or more subscribers of the channels is established.

According to the present disclosure, the nomenclatures used are as defined below.
  System of trust (System)—solution for Software Supply Chain concept described in the present disclosure.
  Software asset—any software that the user can install, deploy, use, run, access (e.g.
  native application, web application, mobile application, remote service, API, etc). Trust records—a set of trust related data for to the particular software asset; it could be formed by raw data or in form of Trust record report—a human readable presentation of the trust related data.
  Trust assertions—a set of conditions that need to be met in order to execute software as set.
  Trust transitive closure—evaluation of the trust for the particular software asset and all of its dependencies (recursively)

The embodiments herein may include a computer program product configured to include a pre-configured set of instructions, which when performed, can result in actions as stated in conjunction with the methods described above. In an example, the pre-configured set of instructions can be stored on a tangible non-transitory computer-readable medium or a program storage device. In an example, the tangible non-transitory computer-readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 17:
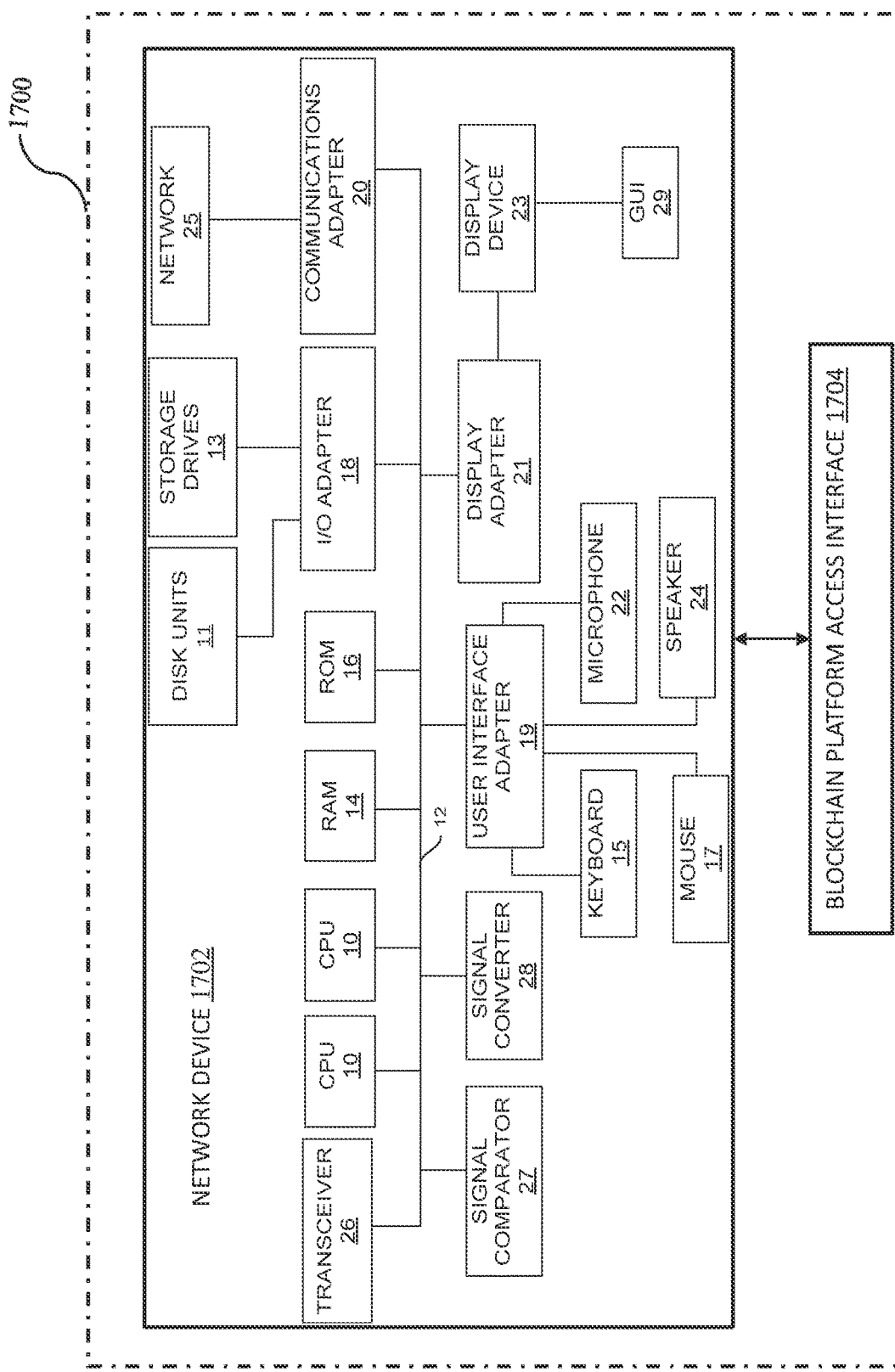
FIG. 17 is a schematic diagram of a computer architecture in accordance with the embodiments herein.

A representative hardware environment for practicing the embodiments herein is depicted in FIG. 17, with reference to FIGS. 2 through 17. This schematic drawing herein illustrates a network device 1702 with one or more processors in communication with a blockchain platform 1700 over a blockchain platform access interface 1704. and the hardware configuration of the network device 1702 in accordance with the embodiments herein. The network device 1702 includes at least one processing device 10. The special-purpose CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The network device 1702 can read the inventive instructions on the program storage devices and follow these instructions to execute the methodology of the embodiments herein. The computing device 301 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

What is claimed is:

1. A non-transitory computer-readable storage medium configured with computer-readable code that when executed by one or more processors of a processing system cause carrying out a method for assessment of Software Bill of Materials (SBOM) across a software supply chain life cycle over a blockchain platform, the method comprising:
   generating a Software Bill of Materials (SBOMs) automatically from a software source code to automate governance of a software asset using blockchain smart contracts;
   publishing the generated Bill of Materials (SBOMs) to a permissioned blockchain through secure publish;
   automatically recording timestamps and ownership stamps to the published SBOM's to protect rights for software vendors and provide security to consumers of the software;
   enabling tracing of ownership of the software assets through the ownership stamps using one or more smart contracts;
   enabling product or application owners to approve or reject based on an analysis of the software supply chain information, wherein analysis of the software supply chain information comprises of:
      enabling software consumers to analyse the software asset for supply chain information;
      verifying if the software asset meets the minimum policy requirements for compliance based on provenance, licensing, vulnerability and security criteria set by the company;
      determining if a third-party software component is approved use in the company's applications based on policy and compliance rules; and
      identifying current vulnerabilities and potential remediation for software in use by the company; and
   establishing secured attestation channels between subscribed users to share policy-based complementary SBOM data and metadata exchange between one or more subscribers of the channels.

2. The non-transitory computer-readable storage medium configured with computer-readable code of claim 1, wherein the secure attestation channel scheme allows for a decentralized root of trust for the one or more subscribers to provide an opportunity for third-party vendors to enrich and create SBOM metadata and attestations.

3. The non-transitory computer-readable storage medium configured with computer-readable code of claim 1, which when executed by the one or more processors further causes the method to perform the steps of:
   automating storing of the SBOM's to a local or distributed database in real-time for each version of software assets developed; and
   providing access to the stored SBOMs to one or more users, each user being associated with an entity, wherein access privilege is present for each user based on a role of each user.

4. The non-transitory computer-readable storage medium configured with computer-readable code of claim 1, which when executed by the one or more processors further causes the method to perform the steps of implementing the blockchain platform in a Software Vulnerability and Nutrition Tracker application, where the Software Vulnerability and Nutrition Tracker application is configured for providing instructions to one or more processors to perform the method of:
   allowing one or more users of the software to monitor vulnerabilities arising in the software assets or dependencies in the software assets in use by company in real-time;
   identifying the software assets in use by the company which are impacted by the vulnerability, identify and assess impact of vulnerability to the company; and
   identifying potential remediation measures and track remediation until vulnerability is resolved.

5. The non-transitory computer-readable storage medium configured with computer-readable code of claim 1, wherein the one or more processors is configured for:
   calling an audit smart contract on deployment of the software asset, wherein the audit smart contract is configured for:
   accessing one or more trust assertions published in a blockchain; and
   determining whether a plurality of audit requirements have been satisfied by a plurality of corresponding audits of the software asset based on the one or more trust assertions published to the blockchain; and
   sending a response of the evaluation of software assets back to the blockchain platform if the software asset is marked with security vulnerability.

6. A blockchain platform for enabling assessment of Software Bill of Materials (SBOM) across a software supply chain life cycle, comprising in combination:
   a network device with one or more processors, a non-transitory computer readable medium and a blockchain platform access interface configured to execute the steps comprising:
   generating a Software Bill of Materials (SBOMs) automatically from a software source code to automate governance of a software asset using blockchain smart contracts;
   publishing the generated Bill of Materials (SBOMs) to a permissioned blockchain through secure publish;
   automatically recording timestamps and ownership stamps to the published SBOM's to protect rights for software vendors and provide security to consumers of the software;
   enabling tracing of ownership of the software assets through the ownership stamps using one or more smart contracts;
   enabling product or application owners to approve or reject based on an analysis of the software supply chain information, wherein analysis of the software supply chain information comprises of:
      enabling software consumers to analyse the software asset for supply chain information;
      verifying if the software asset meets the minimum policy requirements for compliance based on provenance, licensing, vulnerability and security criteria set by the company;
      determining if a third-party software component is approved use in the company's applications based on policy and compliance rules; and
      identifying current vulnerabilities and potential remediation for software in use by the company; and
   establishing secured attestation channels between subscribed users to share policy-based complementary SBOM data and metadata exchange between one or more subscribers of the channels.

7. The blockchain platform of claim 6, wherein the secure attestation channel allows to establish a decentralized root of trust for the one or more subscribers to provide an opportunity for third-party vendors to enrich and create SBOM metadata and attestations.

8. The blockchain platform of claim 6, is further configured to:
- automate storing of the SBOM's to a local or distributed database in real-time for each version of software assets developed; and
- provide access to the stored SBOMs to one or more users, each user being associated with an entity, wherein access privilege is present for each user based on a role of each user.

9. The blockchain platform of claim 6, is configured to be implemented in a Software Vulnerability and Nutrition Tracker application, where the Software Vulnerability and Nutrition Tracker application is configured for providing instructions to one or more processors to execute the steps comprising:
- allowing one or more users of the software to monitor vulnerabilities arising in the software assets or dependencies in the software assets in use by company in real-time;
- identifying the software assets in use by the company which are impacted by the vulnerability, identify and assess impact of vulnerability to the company; and
- identifying potential remediation measures and track remediation until vulnerability is resolved.

10. The blockchain platform of claim 6, wherein the one or more processors is configured to execute the steps comprising:
- calling an audit smart contract on deployment of the software asset, wherein the audit smart contract is configured for:
- accessing one or more trust assertions published in a blockchain; and
- determining whether a plurality of audit requirements have been satisfied by a plurality of corresponding audits of the software asset based on the one or more trust assertions published to the blockchain; and
- sending a response of the evaluation of software assets back to the blockchain platform if the software asset is marked with security vulnerability.

11. A system for assessment of Software Bill of Materials (SBOM) across a software supply chain life cycle, the system comprising in combination:
- a network device, characterized by comprising: one or more processors and a non-transitory computer readable medium and a network interface; and
- a blockchain platform, wherein the platform framework layer is connected to an application layer through an application programmable interface to generate a Software Bill of Materials (SBOMs) automatically from a software source code to automate governance of a software asset using blockchain smart contracts;
- publish the generated Bill of Materials (SBOMs) to a permissioned blockchain through secure publish;
- automatically record timestamps and ownership stamps to the published SBOM's to protect rights for software vendors and provide security to consumers of the software;
- enable tracing of ownership of the software assets through the ownership stamps using one or more smart contracts:
- enable product or application owners to approve or reject based on an analysis of the software supply chain information, wherein analysis of the software supply chain information comprises of:
  - enabling software consumers to analyse the software asset for supply chain information;
  - verifying if the software asset meets the minimum policy requirements for compliance based on provenance, licensing, vulnerability and security criteria set by the company;
  - determining if a third-party software component is approved use in the company's applications based on policy and compliance rules; and
  - identifying current vulnerabilities and potential remediation for software in use by the company; and
- establish secured attestation channels between subscribed users to share policy-based complementary SBOM data and metadata exchange between one or more subscribers of the channels.

* * * * *